US010198153B1

(12) United States Patent
Flack et al.

(10) Patent No.: US 10,198,153 B1
(45) Date of Patent: Feb. 5, 2019

(54) ORDERING ITEMS FOR SWITCHING

(71) Applicant: Google Inc., Mountain View, CA (US)

(72) Inventors: Robert Flack, Kitchener (CA); Terry David Anderson, Kitchener (CA)

(73) Assignee: Google LLC, Mountain View, CA (US)

(*) Notice: Subject to any disclaimer, the term of this patent is extended or adjusted under 35 U.S.C. 154(b) by 558 days.

(21) Appl. No.: 14/447,594

(22) Filed: Jul. 30, 2014

(51) Int. Cl.
G06F 3/0481 (2013.01)
G06F 3/0482 (2013.01)
G06F 3/0484 (2013.01)

(52) U.S. Cl.
CPC .......... G06F 3/0484 (2013.01); G06F 3/0481 (2013.01); G06F 3/0482 (2013.01)

(58) Field of Classification Search
CPC ..... G06F 3/0482; G06F 3/0481; G06F 3/0484
See application file for complete search history.

(56) References Cited

U.S. PATENT DOCUMENTS

| 7,133,859 | B1 * | 11/2006 | Wong | G06Q 10/10 |
| 7,478,326 | B2 * | 1/2009 | Holecek | G06F 3/0481 |
| | | | | 348/E5.104 |
| 8,768,932 | B1 * | 7/2014 | Kacholia | G06F 17/30864 |
| | | | | 707/705 |
| 9,052,925 | B2 * | 6/2015 | Chaudhri | G06F 3/04883 |
| 9,244,606 | B2 * | 1/2016 | Kocienda | G06F 3/04883 |
| 9,335,916 | B2 * | 5/2016 | Kobylinski | G06F 3/0485 |
| 9,513,801 | B2 * | 12/2016 | Chaudhri | G06F 9/4443 |
| 2004/0125143 | A1 * | 7/2004 | Deaton | G06F 17/30067 |
| | | | | 715/765 |
| 2006/0074929 | A1 * | 4/2006 | Weber | G06F 17/30067 |
| 2006/0161861 | A1 * | 7/2006 | Holecek | G06F 17/30994 |
| | | | | 715/782 |
| 2006/0224989 | A1 * | 10/2006 | Pettiross | G06F 3/0483 |
| | | | | 715/779 |
| 2010/0251145 | A1 * | 9/2010 | Leppert | G06F 17/30991 |
| | | | | 715/762 |
| 2011/0202522 | A1 * | 8/2011 | Ciemiewicz | G06F 17/30867 |
| | | | | 707/711 |

(Continued)

OTHER PUBLICATIONS

"Solving The Alt-Tab Problem", located at <http://www.azarask.in/blog/post/solving-the-alt-tab-problem/>, 2010, 4 pages.

Primary Examiner — Kieu D Vu
Assistant Examiner — Blaine T. Basom
(74) Attorney, Agent, or Firm — Morgan, Lewis & Bockius LLP

(57) ABSTRACT

A device that orders items for switching may include a processor circuit. The processor circuit may be configured to identify items that are available for switching, wherein each of the items is associated with a first attribute and a second attribute. The processor circuit may be further configured to order the items based at least in part on the first attributes of the items. The processor circuit may be further configured to determine a subset of the items for display, wherein the subset includes a first number of the ordered items. The processor circuit may be further configured to order the subset of the items based at least on the second attributes of the items. The processor circuit may be further configured to display ordered representations corresponding to the ordered subset of the items for switching. The ordered representations may remain unchanged after switching to an item of the subset.

19 Claims, 5 Drawing Sheets

(56) References Cited

U.S. PATENT DOCUMENTS

| | | | |
|---|---|---|---|
| 2011/0202872 A1* | 8/2011 | Park | G06F 3/0481 |
| | | | 715/790 |
| 2012/0242692 A1* | 9/2012 | Laubach | G09G 5/14 |
| | | | 345/629 |
| 2012/0310994 A1* | 12/2012 | Wionzek | G06F 3/0482 |
| | | | 707/803 |
| 2013/0159930 A1* | 6/2013 | Paretti | G06F 3/0482 |
| | | | 715/821 |
| 2014/0188803 A1* | 7/2014 | James | G06F 17/30174 |
| | | | 707/638 |

* cited by examiner

ORDERING ITEMS FOR SWITCHING

TECHNICAL FIELD

The present description relates generally to ordering items, and more particularly, but not exclusively, to ordering items for switching.

BACKGROUND

Operating systems and/or applications may provide users with a mechanism to quickly switch between frequently accessed items, such as windows, tabs, etc. For example, an operating system may provide a user with a most recently used list of items that is ordered based on the last time that each of the items was accessed by the user. The user may select an item from the list to quickly switch to the selected item. This switching mechanism may provide the user with convenient access to the items they have used most recently. However, the order of the items in a most recently used list may change frequently, e.g. each time the user switches to a different item. Thus, each time the most recently used list is viewed by the user the items of the list may be positioned in a different order. The lack of consistency in regard to the positioning of the items in the list may be counter-intuitive to the user and/or may contravene the user's spatial memory.

SUMMARY

The disclosed subject matter relates to a computer implemented method for ordering windows for switching. The method may include identifying, using one or more computing devices, a plurality of windows that are available for switching. The method may further include ordering, using the one or more computing devices, the plurality of windows based at least in part on a first attribute of each of the plurality of windows. The method may further include determining, using the one or more computing devices, a first subset of the plurality of windows to be displayed for switching, wherein the first subset comprises a first number of the ordered plurality of windows. The method may further include ordering, using the one or more computing devices, the first subset of the plurality of windows based at least in part on a second attribute of each of the first subset of the plurality of windows. The method may further include displaying, using the one or more computing devices, a first representation of the ordered first subset of the plurality of windows for switching.

The disclosed subject matter also relates to a device that includes at least one processor circuit that is configured to identify a plurality of items that are available for switching, wherein each of the plurality of items is associated with one of a plurality of first attributes and one of a plurality of second attributes. The at least one processor circuit is further configured to order the plurality of items based at least in part on the plurality of first attributes associated with the plurality of items. The at least one processor circuit is further configured to determine a subset of the plurality of items for display, wherein the subset comprises a first number of the ordered plurality of items. The at least one processor circuit is further configured to order the subset of the plurality of items based at least in part on the plurality of second attributes of the subset of the plurality of items. The at least one processor circuit is further configured to display an ordered plurality of representations corresponding to the ordered subset of the plurality of items for switching.

The disclosed subject matter also relates to a non-transitory machine-readable medium embodying instructions that, when executed by a machine, cause the machine to perform a method that may include ordering a plurality of items that are available for switching based at least in part on a first attribute of the plurality of items. The method may further include individually ordering first and second subsets of the plurality of items based at least in part on a second attribute of the plurality of items, the first subset comprising a first number of the ordered plurality of items and the second subset comprising a second number of the ordered plurality of items. The method may further include switching to one of the plurality of items. The method may further include reordering the plurality of items when the one of the plurality of items is part of the second subset, otherwise maintaining the ordering of the first and second subsets of the plurality of items.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
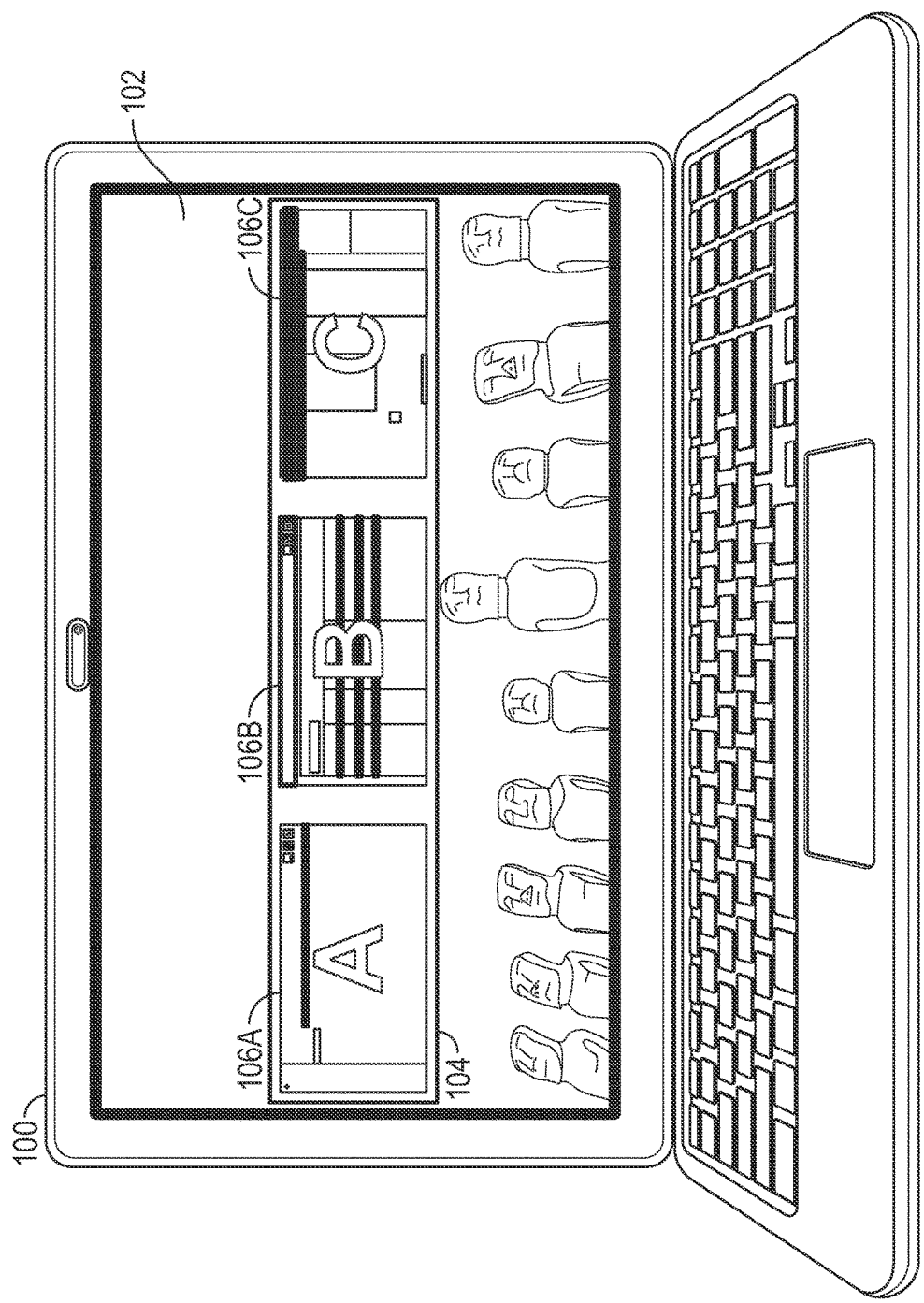
FIG. 1 illustrates an example electronic device that may implement a system for ordering items for switching in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In some instances, structures and components are shown in block diagram form in order to avoid obscuring the concepts of the subject technology.

In the subject system for ordering items for switching, items that are available for switching, such as windows, tabs, desktops, tasks, and the like, may be identified and ordered based on a first attribute of the items, such as a last accessed time. The system may then determine a number of the items that can be displayed (or previewed) to the user at one time for switching, such as in a switching interface. The number of items that can be displayed at one time for switching may be based on any number of display variables, such as screen size, font size, etc. The system may segment the ordered items into subsets for display based on the number of items that can be displayed at one time. For example, a first subset for display may include a first number of the ordered items and a second subset for display may include a second subsequent number of the ordered items. The system may then individually order the items of each of the subsets based at least on a second attribute of the items, such as a first accessed time (e.g. opening time).

Upon receiving a request to switch items, the system may display the first subset of items (and/or representations thereof) to the user for switching. If the user scrolls past the last item of the first subset of the items, the system may display the second subset of items (and/or representations thereof) to the user for switching, etc. If the user switches to an item in the first subset of the items, then the segmenting and the ordering of the subsets in the subject system remain unchanged. In other words, although the last accessed time of the switched-to item will increase, since the switched-to item is already part of the first subset of the items, the segmenting of the ordered items into subsets (i.e. based on the last accessed time) remains unchanged. Furthermore, since the first accessed time of the switched-to item does not change, the orders of the individual subsets of items (i.e. based on the first accessed time), also remains unchanged. Thus, the next time that the system displays the first subset of the items (and/or representations thereof) to the user, the item switched-to will be displayed in the same position as it was previously displayed.

However, if the user switches to an item from another subset of the items (other than the first subset), then the segmenting and the ordering of the subsets will change, e.g. in order to move the switched-to item into the first subset. In other words, since the last accessed time of the switched-to item will increase, the switched-to item will become the first item in the ordered list of the items available for switching, thereby causing the item to move into the first subset of the items and causing the least recently used item of the first subset to fall back to the second subset, etc. However, since the first accessed time of the switched-to item does not change, the item will be positioned in the first subset in a consistent manner, e.g. based on the static first accessed times of the other items of the first subset.

Thus, the first attribute that is used to order all of the items that are available for switching may be a dynamic attribute, such as the last accessed time, while the second attribute that is used to order the individual subsets of the items for display may be a static attribute, such as the first accessed time. Accordingly, the subject system is able to order the items for switching based at least in part on a dynamic attribute, such as the last accessed time, and also based at least in part on a static attribute, such as the first accessed time, which may provide the user with convenient access to the most recently used items while also maintaining consistency with regard to the positioning of the items (and/or representations thereof).

FIG. 1 illustrates an example electronic device 100 which may implement a system for ordering items for switching in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The example electronic device 100 may be any device, such as a computing device, a laptop computer, a desktop computer, a smartphone, a tablet device, a wearable device, such as eyeglasses or a watch that has one or more processors coupled thereto and/or embedded therein, televisions or other displays with one or more processors coupled thereto and/or embedded therein, or other appropriate devices that can be used to for presenting items for switching, e.g. items that can be switched to, such as any device capable of providing items for display. In the example of FIG. 1, the example electronic device 100 is depicted as a laptop computer. In one or more implementations, the example electronic device 100 may be, or may include all or part of, the electronic system that is discussed further below with respect to FIG. 5.

The example electronic device 100 may include an output device 102. The output device 102 may be any device capable of presenting a representation of one or more items for switching, such as a screen, a projecting device, an audio output device, and the like. In the example of FIG. 1 the output device 102 is depicted as a screen. The output device 102 may present a switching interface 104 that includes representations 106A-C of items that can be selected for switching. In the example of FIG. 1, the switching interface 104 is depicted as a graphical interface; however, the switching interface 104 may also be an audio interface, or generally any interface. The switching interface 104 may present any number of representations 106A-C to a user, such as three representations 106A-C as depicted in the example of FIG. 1. The number of representations 106A-C displayed at one time may be determined based on one or more factors, such as screen size, available screen space, screen resolution, the size of the representations 106A-C, or any other factor. In one or more implementations, the representations 106A-C may be presented directly on the output device 102, e.g. without displaying a switching interface 104.

The representations 106A-C of the items that are available for switching may be a graphical representation, an audio representation, or generally any representation of an item that is available for switching. In the example of FIG. 1, the representations 106A-C are depicted as graphical representations of items, e.g. windows, that are available for switching, e.g. miniaturized versions of the windows that are available for switching. The items available for switching may be any items that can be switched to by the electronic device 100, such as windows, tabs, desktops, tasks, operating system instances, multimedia content items, such as audio files, or generally any items that may be switched to or switched between by the electronic device 100. In the example of FIG. 1, the items available for switching are depicted as application windows of an operating system.

In one or more implementations, a user may be able to scroll through the representations 106A-C of the switching interface 104 to select one of the representations 106A-C. If the user scrolls past the last representation 106C of the switching interface 104, and additional items are available for switching, the electronic device 100 may present three different representations in the switching interface 104 for selection by the user. For example, the electronic device 100 may segment the items that are available for switching into subsets, or groups. The number of items in each subset and/or group may coincide with the number of the representations 106A-C that can be displayed in the switching interface 104 at any one time. The electronic device 100 may then replace the representations 106A-C in the switching interface 104 that correspond to a first subset of items with representations that correspond to the next subset of items when a user scrolls past the last displayed representation 106C in the switching interface 104. The electronic device 100 may continue to present additional representations of additional subsets when the user scrolls past the last displayed representation until all the representations of all of the subsets have been displayed at which point the electronic device 100 may cycle back to presenting the representations 106A-C of the first subset of items.

Thus, if there are a significant number of items available for selection, a user may need to scroll through multiple subsets of representations 106A-C in order to select the representation corresponding to a particular item. Accordingly, the electronic device 100 may order the items, and the displayed representations 106A-C thereof, in a manner that facilitates the user with switching between the items. Example processes for ordering items for switching are discussed further below with respect to FIGS. 2 and 3. Example subsets of items are discussed further below with respect to FIGS. 4A-C and 5.

Figure 2:
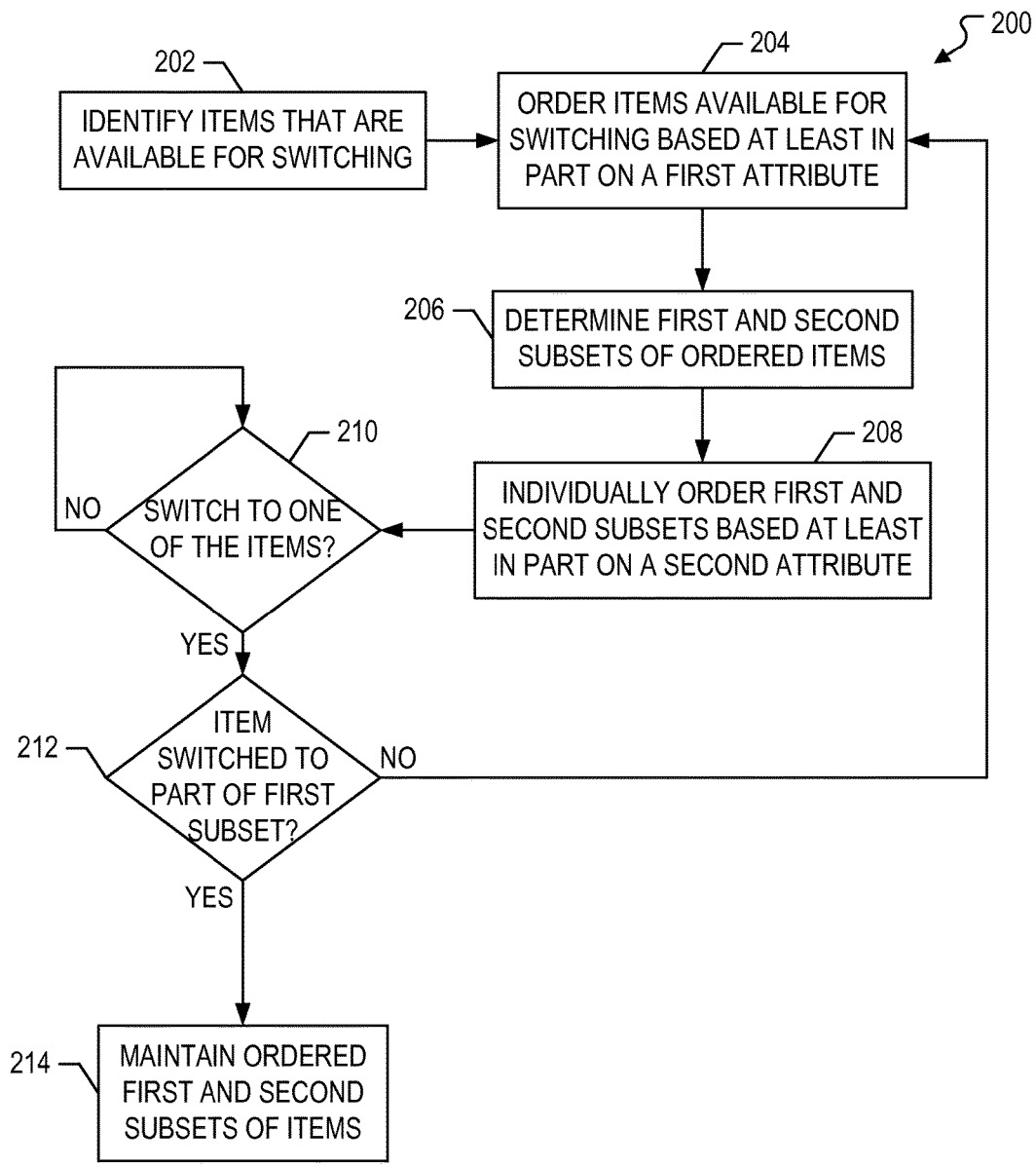
FIG. 2 illustrates a flow diagram of an example process of a system for ordering items for switching in accordance with one or more implementations.

FIG. 2 illustrates a flow diagram of an example process 200 of a system for ordering items for switching in accordance with one or more implementations. For explanatory purposes, the example process 200 is primarily described herein with reference to electronic device 100 of FIG. 1; however, the example process 200 is not limited to the electronic device 100 of FIG. 1, and the example process 200 may be performed by one or more components of the electronic device 100, such as, for example, one or more processor circuits. Further for explanatory purposes, the blocks of the example process 200 are described herein as occurring in serial, or linearly. However, multiple blocks of the example process 200 may occur in parallel. In addition, the blocks of the example process 200 may be performed a different order than the order shown and/or one or more of the blocks of the example process 200 may not be performed.

In block 202, the electronic device 100 identifies items that are available for switching. For example, the electronic device 100 may determine a number of open applications that can be switched to, a number of open windows that can be switched to, a number of open tabs that can be switched to, and the like. In block 204, the electronic device 100 orders the items that are available for switching based at least in part on a first attribute of the items. The first attribute of the items may be any attribute of the items, such as a last accessed time, a first accessed time, a title, an owner/user, or generally any attribute for which it may be desirable to order the items. In one or more implementations, the first attribute of the items may be a dynamic attribute of the items, such an attribute that can continuously change over time, e.g. a last accessed time. The items may be ordered ascending or descending with respect to the first attribute.

In block 206, the electronic device 100 determines a first subset and a second subset of the ordered items. The first subset may include a number of the ordered items for which the representations thereof can be presented to the user at one time, such as three in the example of FIG. 1. In one or more implementations, the first subset may include the first three items of the ordered items. The second subset may include the number of the ordered items that can be presented at one time, or the number of items that remain after determining the first subset, if the number of items that remain is less than the number of the ordered items that can be presented at one time. In one or more implementations, the second subset may include the next three items of the ordered items after the first three items of the first subset.

Thus, the electronic device 100 may present representations 106A-C of the first subset of items to the user when the user requests to switch between the items. If the user scrolls past the last representation 106C, then the electronic device 100 may present representations of the second subset of the items to the user in place of the representations 106A-C of the first subset of the items.

In block 208, the electronic device 100 individually orders the first subset and the second subset of items based at least in part on a second attribute of the items. Thus, the electronic device 100 may reorder the items of the first subset and separately reorder the items of the second subset. The second attribute of the items may be any attribute of the items, such as a last accessed time, a first accessed time, a title, an owner/user, or generally any attribute for which it may be desirable to order the items. The items may be ordered ascending or descending with respect to the second attribute. In one or more implementations, the second attribute may be different than the first attribute, and the second attribute may be a static attribute, such as an attribute that does not change over time, e.g. a first accessed time.

In block 210, the electronic device 100 determines whether one of the items has been switched to. For example, a user may use a user input device of the electronic device 100, such as a keyboard, to switch to one of the items directly. In one or more implementations, the electronic device 100 may display the switching interface 104 to the user, e.g. in response to a request therefor, and the user may select one of the representations 106A-C to switch to the corresponding item. In one or more implementations, the electronic device 100 may automatically switch to one of the items, e.g. to present a dialog or alert associated with the one of the items. If, in block 210, the electronic device 100 determines that no items have been switched to, the electronic device 100 remains at block 210. If, in block 210, the electronic device 100 determines that one of the items has been switched to, the electronic device 100 moves to block 212.

In block 212, the electronic device 100 determines whether the item switched to in block 210 is part of the first subset of the items. If, in block 212, the electronic device 100 determines that the item switched to in block 210 is part of the first subset of items, the electronic device 100 moves to block 214. In block 214, the electronic device 100 maintains the ordered first and second subsets of the items for switching. Thus, if the user subsequently requests to switch between the items, the electronic device 100 may present the representations 106A-C of the first subset of the items.

If, in block 212, the electronic device 100 determines that the item switched to is not part of the first subset of the items, then the electronic device 100 returns to block 204. In block 204, the electronic device 100 reorders the items based at least in part on the first attribute, the electronic device 100 re-determines the first and second subsets of the ordered items in block 206, and then the electronic device 100 individually reorders the first and second subsets of the items based at least in part on the second attribute in block 208. Thus, if an item switched to is part of the first subset of items, then the items in the first subset, and the order of the items in the first subset and the corresponding first displayed representations 106A-C, do not change. However, if an item switched to is not part of the first subset of items, and therefore does not correspond to one of the first displayed representations 106A-C, then the items in the first subset will change to include the item switched to. The items in the first subset may also be rearranged in such that the item switched-to is ordered in a consistent and static manner with regard to the other items in the first subset.

Figure 3:
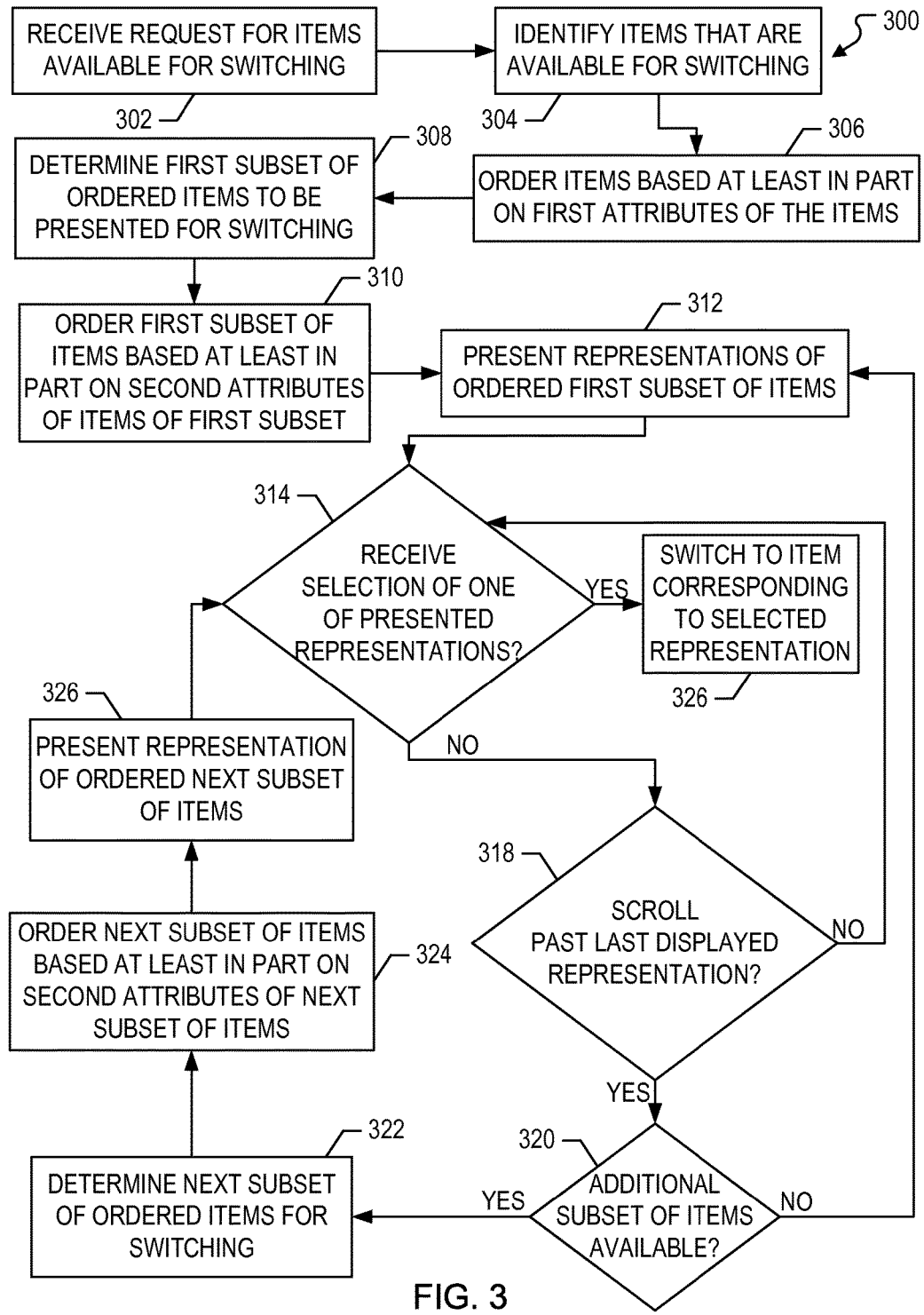
FIG. 3 illustrates a flow diagram of an example process of a system for ordering items for switching in accordance with one or more implementations.

FIG. 3 illustrates a flow diagram of an example process 300 of a system for ordering items for switching in accordance with one or more implementations. For explanatory purposes, the example process 300 is primarily described herein with reference to electronic device 100 of FIG. 1; however, the example process 300 is not limited to the electronic device 100 of FIG. 1, and the example process 300 may be performed by one or more components of the electronic device 100, such as, for example, one or more processor circuits. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

In block 302, the electronic device 100 receives a request for items available for switching. For example, a user may use an input device to request the items available for switching, such as by pressing one or more keys, making an on-screen selection, and the like. In block 304, the electronic device 100 identifies the items that are available for switching, such as windows, tabs, documents, etc. In block 306, the electronic device 100 orders the items that are available for switching based at least in part on first attributes of the items, such as the last accessed time of the items. In block 308, the electronic device determines a first subset of the ordered items to be presented, e.g. displayed, for switching. For example, the electronic device 100 may segment or group a first number of the ordered items into the first subset. In block 310, the electronic device 100 orders the first subset of items based at least in part on second attributes of the items of the first subset, such as last accessed times, or last used times, of the items.

In block 312, the electronic device 100 presents, e.g. displays, representations 106A-C of the first subset of the items for switching to the user. In block 314, the electronic device 100 determines whether a selection of one of the displayed representations 106A-C of the first subset of the items has been received, e.g. via a user input device. If, in block 314, the electronic device 100 determines that a selection of one of the presented representations has been received, the electronic device 100 moves to block 326. In block 326, the electronic device 100 switches to the item corresponding to the selected representation. For example, if the items are application windows and/or tabs, the electronic device 100 may switch to the selected application window and/or tab by bringing the application window and/or tab to the foreground, e.g. presenting the application window and/or tab in front of and/or on top of any other application windows and/or tabs, and/or by setting a focus to the application window and/or tab.

If, in block 314, the electronic device 100 determines that a selection of one of the presented representations has not been received, the electronic device 100 moves to block 318. In block 318, the electronic device 100 determines whether the user has scrolled past the last displayed representation, such as the representation 106C of FIG. 1. If, in block 318, the electronic device 100 determines that the user has not scrolled past the last displayed representation, the electronic device 100 returns to block 314. If, in block 318, the electronic device 100 determines that the user has scrolled past the last displayed representation, the electronic device 100 moves to block 320.

In block 320, the electronic device 100 determines whether any additional subsets of items are available for switching, such as whether any items remain for which representations have not been presented to the user. If, in block 320, the electronic device 100 determines that there are no additional subsets of items available for switching, the electronic device 100 returns to block 312 and presents and/or maintains presentation of, the representations 106A-C of the first ordered subset of the items. Thus, after the electronic device 100 has presented representations of all of all of the subsets of items that are available for switching, the electronic device 100 returns to presenting the representations 106A-C of the first subset of items.

If, in block 320, the electronic device 100 determines that there is an additional subset of items available for switching, the electronic device 100 moves to block 322. In block 322, the electronic device 100 determines the next subset of the ordered items for switching, such as a second subset of the ordered items. In block 324, the electronic device 100 orders the next subset of the items based at least in part on the second attributes of the next subset of items, such as the first opened times or first accessed times of the items. In block 326, the electronic device 100 presents, e.g. displays, the representations of the ordered next subset of items to the user. The electronic device 100 then returns to block 314 to determine whether a selection of one of the representations of the ordered next subset of the items has been received.

Figure 4A:
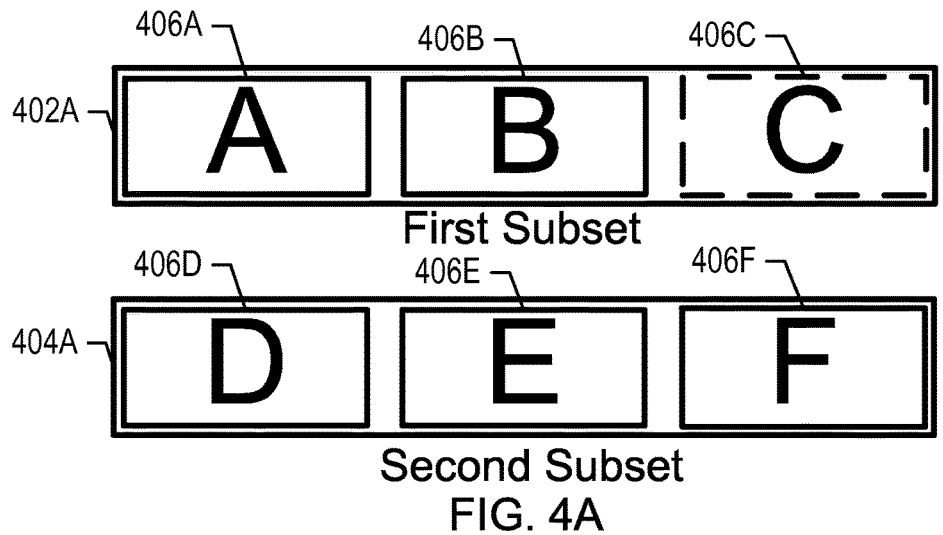
FIGS. 4A-C illustrate example subsets of items in a system for ordering items for switching in accordance with one or more implementations.
Figure 4B:
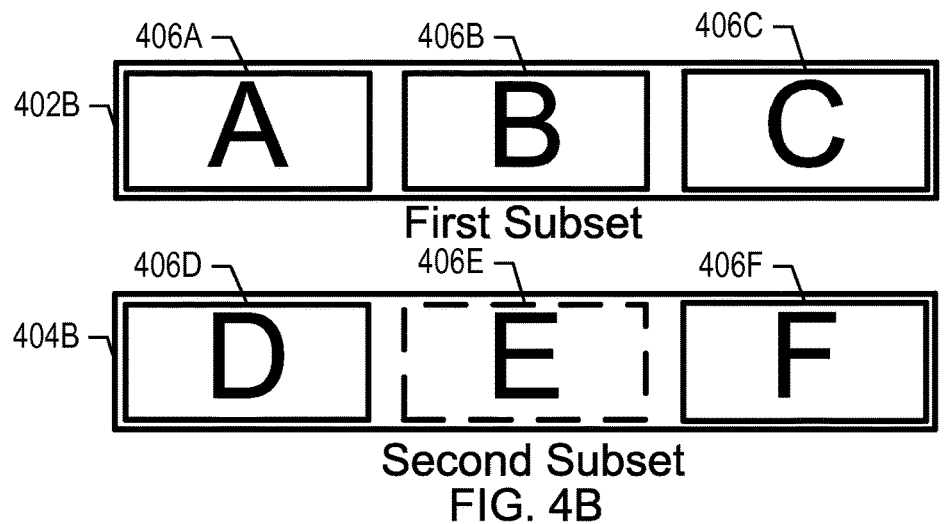
Figure 4C:
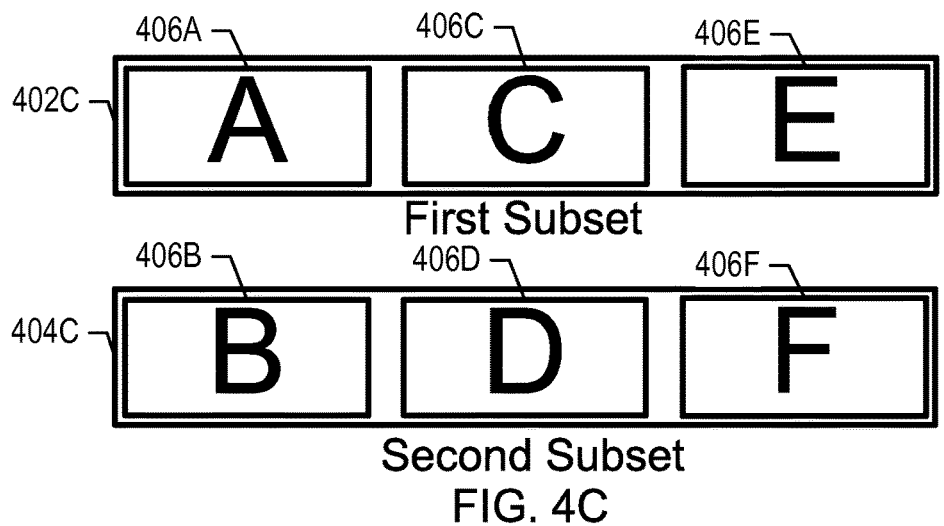

FIGS. 4A-C illustrate example subsets of items in a system for ordering items for switching in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

FIG. 4A includes a first subset 402A of items 406A-C and a second subset 402B of items 406D-F. The items 406A-F may be ordered by the electronic device 100 based at least in part on one or more attributes, such as a last accessed time and/or a first accessed time. For example, the item 406A may be the most recently used (highest last accessed time) and the most recently opened (highest first accessed time), while the item 406F may be the least recently used (lowest last accessed time) and the least recently opened (lowest first accessed time). In one or more implementations, the electronic device 100 may first display representations of the first subset 402A of items 406A-C, and, if the user scrolls past the representation of the last item 406C, then the electronic device 100 may display representations of the second subset 404A of items 406D-F. In FIG. 4A, the item 406C is represented with dashed lines to indicate that the item 406C has been switched to, such as by a user selecting the representation of the item.

FIG. 4B includes a first subset 402B of the items 406A-C, and a second subset 404B of the items 406D-F. The first and second subsets 402B,404B of FIG. 4B represent the first and second subsets 402A,404A of FIG. 4A after switching to the item 406C. As indicated in FIGS. 4A-B, since the selected item 406C is in the first subset 402A, the items 406A-F of the first and second subsets 402A,404A, and the ordering thereof, does not change with regard to the first and second subsets 402B,404B. That is, the ordering of the items 406A-F based on the first attribute, e.g. the last accessed time, changes to item 406C, item 406A, item 406B, item 406D, item 406E, and item 406F, and therefore the items 406A-F of the first and second subsets 402B,404B do not change. Furthermore, when the items 406A-C of the first subset 402B are then ordered based on the second attribute, e.g. the first accessed time, the order of item 406C, item 406A, item 406B changes to item 406A, item 406B, item 406C, thereby keeping the items 406A-C in a consistent order after the switching. In FIG. 4B, the item 406E is represented with dashed lines to indicate that the item 406E has been switched to, such as by a user selecting the representation of the item.

FIG. 4C includes a first subset 402C of the items 406A, C,E, and a second subset 404C of the items 406B,D,F. The first and second subsets 402C,404C of FIG. 4C represent the first and second subsets 402B,404B of FIG. 4B after switching to the item 406E. As indicated in FIGS. 4B-C, since the switched-to item 406E is in the second subset 404B, the items 406A-F of the first and second subsets 402B,404B, and the ordering thereof, changes with respect to the first and second subsets 402C,404C.

As shown in FIG. 4C, since the switched to item 406E is in the second subset 404B of FIG. 4B, the first and second subsets 402C,404C change with respect to the first and second subsets 402B,404B. That is, the ordering of the items based on the first attribute, e.g. the last accessed time, becomes item 406E, item 406C, item 406A, item 406B, item 406D, item 406F. Thus, the first subset 402C contains items 406E,C,A, and the second subset 404C contains items 406B,D,F. However, when the first subset 402C is ordered based at least on the second attribute, e.g. the first accessed time, the order of the items 406E,C,A changes to item 406A,C,E, as shown in FIG. 4C. In this manner, the items 406A-F are ordered based at least in part on a dynamic attribute, e.g. the last accessed time and based at least in part on a static attribute, e.g. the first accessed time.

Figure 5:
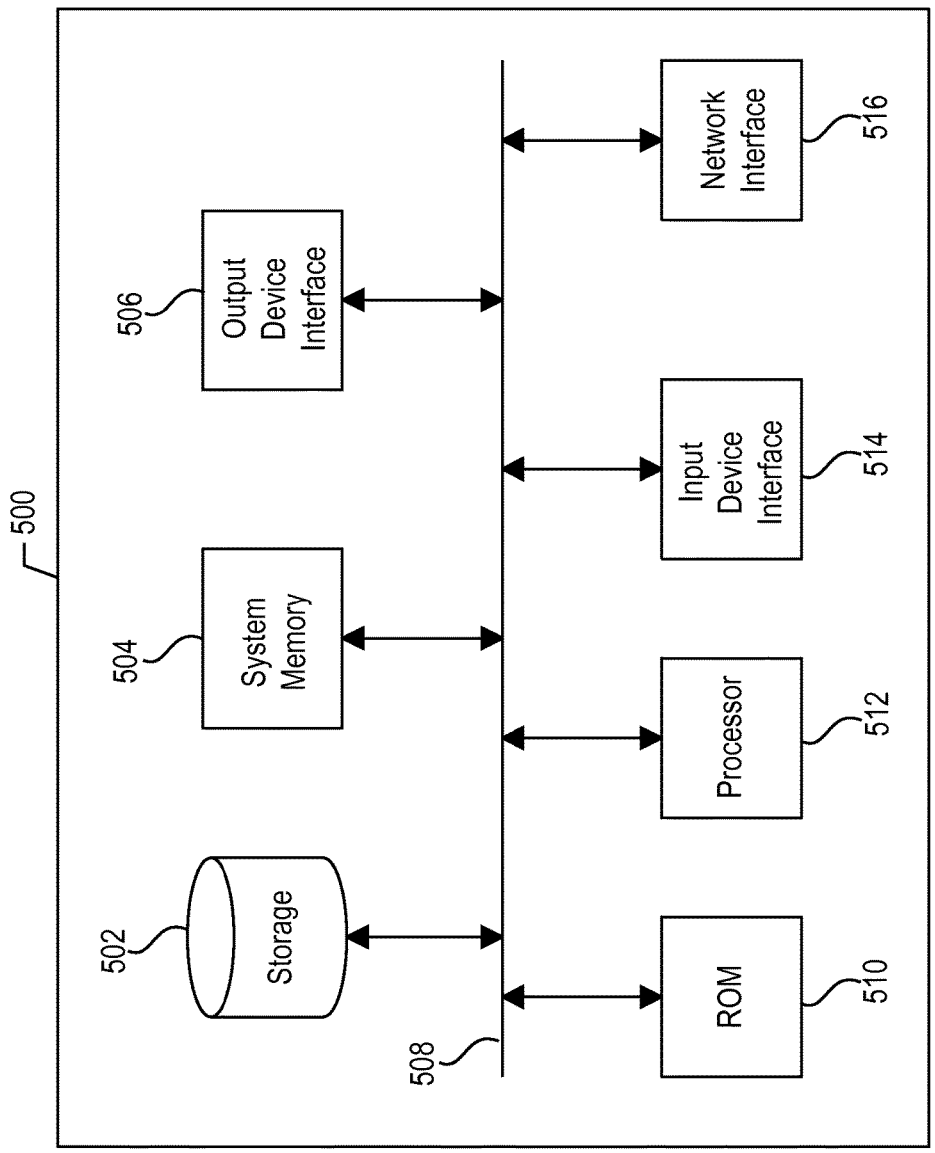
FIG. 5 conceptually illustrates an electronic system with which one or more implementations of the subject technology may be implemented.

FIG. 5 conceptually illustrates electronic system 500 with which any implementations of the subject technology may be implemented. Electronic system 500, for example, can be a desktop computer, a laptop computer, such as the electronic device 100 of FIG. 1, a tablet computer, a server, a receiver, a phone, or generally any electronic device that switches between items. Such an electronic system 500 includes various types of computer readable media and interfaces for various other types of computer readable media. Electronic system 500 includes bus 508, processing unit(s) 512, system memory 504, read-only memory (ROM) 510, permanent storage device 502, input device interface 514, output device interface 506, and network interface 516, or subsets and variations thereof.

Bus 508 collectively represents all system, peripheral, and chipset buses that communicatively connect the numerous internal devices of electronic system 500. In one or more implementations, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores any of the instructions and data that processing unit(s) 512 needs at runtime. In one or more implementations, the processes of the subject disclosure are stored in system memory 504, permanent storage device 502, and/or ROM 510. From these various memory units, processing unit(s) 512 retrieves instructions to execute and data to process in order to execute the processes of one or more implementations.

Bus 508 also connects to input and output device interfaces 514 and 506. Input device interface 514 enables a user to communicate information and select commands to the electronic system. Input devices used with input device interface 514 include, for example, alphanumeric keyboards and pointing devices (also called "cursor control devices"). Output device interface 506 enables, for example, the display of images generated by electronic system 500. Output devices used with output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, bus 508 also couples electronic system 500 to a network (not shown) through network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims.

No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for ordering windows for switching, the method comprising:
   identifying, using one or more computing devices, a plurality of windows that are available for switching;
   ordering, using the one or more computing devices, the plurality of windows based at least in part on a first attribute of each of the plurality of windows;
   determining, using the one or more computing devices, a first subset of the plurality of windows to be displayed for switching and a second subset of the plurality of windows, wherein the first subset comprises a first sequential number of the ordered plurality of windows, the second subset comprises a next sequential number of the ordered plurality of windows, and the second subset is non-intersecting with the first subset;
   ordering, using the one or more computing devices, the first subset of the plurality of windows based at least in part on a second attribute of each of the first subset of the plurality of windows and the second subset of the plurality of windows based at least in part on the second attribute of each of the second subset of the plurality of windows; and
   displaying, using the one or more computing devices, a first representation of each of the ordered first subset of the plurality of windows for switching without displaying representations of the second subset of the plurality of windows.

2. The computer-implemented method of claim 1, further comprising:
   receiving, using the one or more computing devices, a selection of one of the first representations of the ordered first subset of the plurality of windows; and
   switching, using the one or more computing devices, to the one of the ordered first subset of the plurality of windows corresponding to the selected one of the first representations.

3. The computer-implemented method of claim 2, further comprising:
   subsequent to switching, displaying, using the one or more computing devices, the first representations of the ordered first subset of the plurality of windows for switching, wherein the ordered first subset of the plurality of windows remains unchanged subsequent to the switching.

4. The computer-implemented method of claim 1, wherein the first attribute comprises a dynamic attribute and the second attribute comprises a static attribute.

5. The computer-implemented method of claim 4, wherein the first attribute comprises a last accessed time and the second attribute comprises at least one of a first accessed time or a window title.

6. The computer-implemented method of claim 1, further comprising:
   receiving, using the one or more computing devices, a request for the plurality of windows that are available for switching; and
   in response to receiving the request, displaying, using the one or more computing devices, the first representations of the ordered first subset of the plurality of windows for switching.

7. The computer-implemented method of claim 1, wherein each of the first representations comprises a miniaturized version of each corresponding window of the ordered first subset of the plurality of windows.

8. The computer-implemented method of claim 1, further comprising:
   scrolling, using the one or more computing devices, through the first representations of the ordered first subset of the plurality of windows; and
   upon scrolling, using the one or more computing devices, past a last representation of the first representations, displaying, using the one or more computing devices, a second representation of each of an ordered second subset of the plurality of windows for switching, the ordered second subset being ordered based at least in part on the second attribute of each of the ordered second subset of the plurality of windows.

9. The computer-implemented method of claim 8, further comprising:
   displaying, using the one or more computing devices, the second representations of the ordered second subset of the plurality of windows in place of the first representations of the ordered first subset of the plurality of windows.

10. The computer-implemented method of claim 8, wherein the second subset of the plurality of windows comprises a second number of the ordered plurality of windows, and the second subset is exclusive of each of the plurality of windows of the first subset.

11. A device comprising:
    at least one processor circuit that is configured to:
       identify a plurality of items that are available for switching, wherein each of the plurality of items is associated with one of a plurality of first attributes and one of a plurality of second attributes, the plurality of items comprising a plurality of windows;
       order the plurality of items based at least in part on the plurality of first attributes associated with the plurality of items;
       determine a subset of the plurality of items for display and another subset of the plurality of items, wherein the subset comprises a first sequential number of the ordered plurality of items, the another subset comprises a next sequential number of the ordered plurality of items, the another subset is non-intersecting with the subset, the subset is designated as for display, and the another subset is designated as not for display;
       order the subset of the plurality of items that is designated as for display, exclusive of the another subset of items that is not designated for display, based at least in part on the plurality of second attributes of the subset of the plurality of items; and display an ordered plurality of representations corresponding to the ordered subset of the plurality of items that is designated as for display for switching without displaying representations of the another subset of the plurality of items that is designated as not for display.

12. The device of claim 11, wherein the first attribute comprises a last accessed time and the second attribute comprises at least one of a first accessed time or an item title.

13. The device of claim 11, wherein the processor circuit is configured to:

receive a selection of a first representation of the ordered plurality of representations corresponding to a first item of the ordered subset of the plurality of items; and switch to the first item of the ordered subset of the plurality of items.

14. The device of claim 13, wherein the processor circuit is further configured to:

subsequent to the switch, re-display the ordered plurality of representations corresponding to the ordered subset of the plurality of items for switching, wherein the ordered plurality of representations remains unchanged subsequent to the switch.

15. The device of claim 11, wherein the at least one processor circuit is configured to:

order the another subset of the plurality of items based at least in part on the plurality of second attributes of the another subset of the plurality of items;

scroll through the ordered plurality of representations corresponding to the ordered subset of the plurality of items; and upon scrolling past a last representation of the ordered plurality of representations corresponding to the ordered subset of the plurality of items, display another plurality of representations corresponding to the another ordered subset of the plurality of items for switching.

16. A non-transitory machine readable medium embodying instructions that, when executed by a machine, cause the machine to perform a method comprising:

ordering a plurality of items that are available for switching based at least in part on a first attribute of the plurality of items, the plurality of items comprising a plurality of windows;

individually ordering first and second subsets of the plurality of items based at least in part on a second attribute of the plurality of items, the first subset comprising a first sequential number of the ordered plurality of items and the second subset comprising a next sequential number of the ordered plurality of items, and the first subset being non-intersecting with the second subset;

displaying, a first representation of each of the ordered first subset of the plurality of items for switching without displaying representations of the second subset of the plurality of items;

switching to one of the plurality of items by traversing at least a portion of the first subset of the plurality of items; and reordering the plurality of items based at least in part on the first attribute when the one of the plurality of items is part of the second subset, otherwise maintaining the ordering of the first and second subsets of the plurality of items.

17. The non-transitory machine readable medium of claim 16, wherein the method further comprises:

upon traversing past a last item of the ordered first subset of the plurality of items, traversing the ordered second subset of the plurality of items for switching.

18. The non-transitory machine readable medium of claim 17, wherein the method further comprises:

displaying a second representation of the ordered second subset of the plurality of items for switching after traversing past the last item of the ordered first subset of the plurality of items.

19. The non-transitory machine readable medium of claim 16, wherein the first attribute comprises a last accessed time.

\* \* \* \* \*